J. H. MILLS.

System of Steam and Water-Piping for Buildings.

No. 6,591. Reissued Aug. 10, 1875.

Witnesses.

Geo Gray

F. C. Hale

John H. Mills.

by his attorney

F. P. Hale

UNITED STATES PATENT OFFICE

JOHN H. MILLS, OF BOSTON, MASSACHUSETTS.

IMPROVEMENT IN SYSTEMS OF STEAM AND WATER PIPING FOR BUILDINGS.

Specification forming part of Letters Patent No. 145,962, dated December 30, 1873: reissue No. 6,591, dated August 10, 1875; application filed June 10, 1875.

*To all whom it may concern:*

Be it known that I, JOHN H. MILLS, of Boston, in the county of Suffolk and State of Massachusetts, have invented an Improved System of Piping for Buildings to be heated by steam, of which the following is a specification:

This invention relates to a new and improved method of piping for buildings to be heated with steam, whereby the cost of steam-heat is reduced and a more simple and efficient apparatus is supplied.

Prior to my experiments and the perfection of the invention now under consideration, the theory and practice of engineers and experts was reduced to the employment of two pipes, and, as far as possible, a separation of the steam and the water resulting from condensation, thus rendering necessary two connections to each radiator and the employment of two valves which required to be opened and closed simultaneously, or the radiators would become filled with water.

In the earlier stages of low-pressure steam-heating a single pipe was tried, but the glaring defects of the arrangements (viz., supplying the steam upward against the descending water of condensation, and thereby causing noise and an impeded circulation in both pipes and radiators) soon caused the same to be abandoned. The later practice, and that in vogue prior to my invention, (viz., the employment of two pipes, one to supply the steam, and the other to carry off the water of condensation,) while greatly increasing the cost, has not entirely removed the conflict of the elements thus brought into juxtaposition, for steam, air, and water will not move harmoniously together until their relative specific gravities are duly considered and provision made therefor.

Under my system no conflict is possible, for the steam, being conducted from the generator through one or more vertical mains to a point above the heating devices, and from thence distributed downward, is always on the top of the deuser and heavier elements, which, thus arranged, move on in harmony with the law of gravity and without impediment both in their passage from the radiators and in their return to the generator. It will also be evident to those at all conversant with the operation of steam-heating that, once having conducted the steam to a point above the radiators, and arranged for the escape of the air at the lowest, (but above the water-line of the boiler,) the question of a perfect, noiseless circulation would be no longer a doubtful one.

Figure 1:
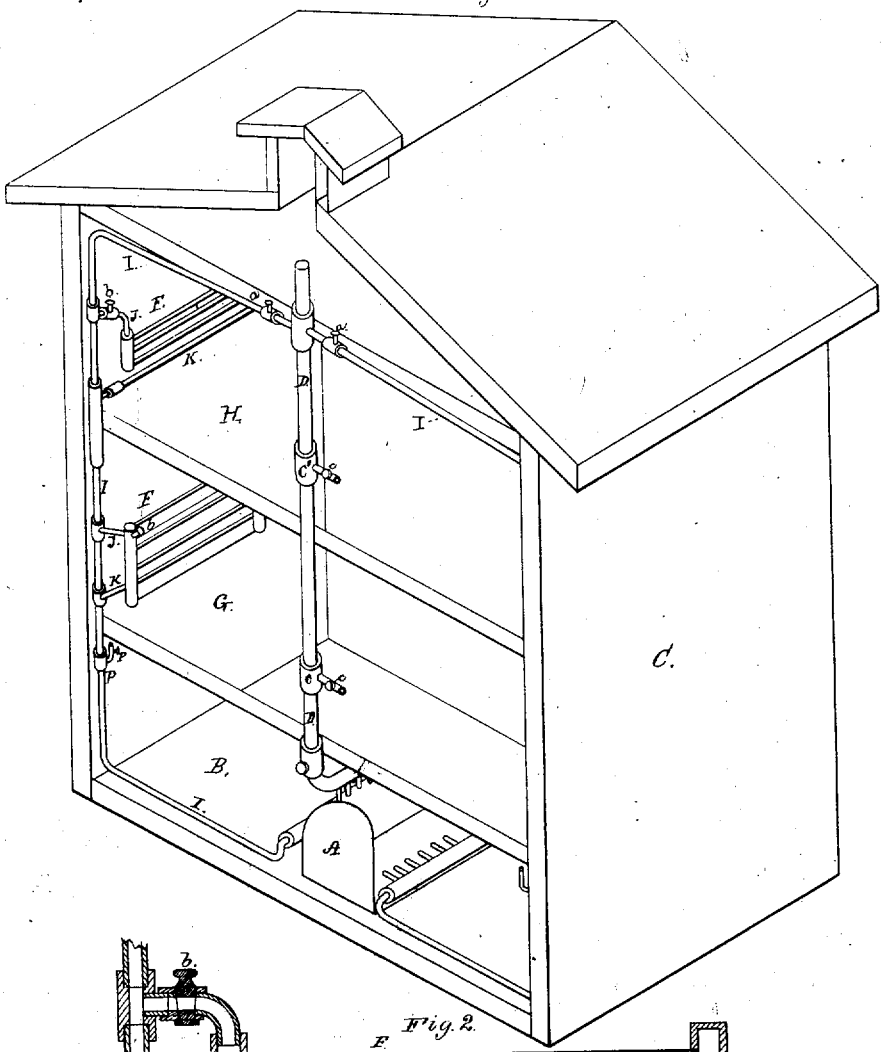
Figure 2:
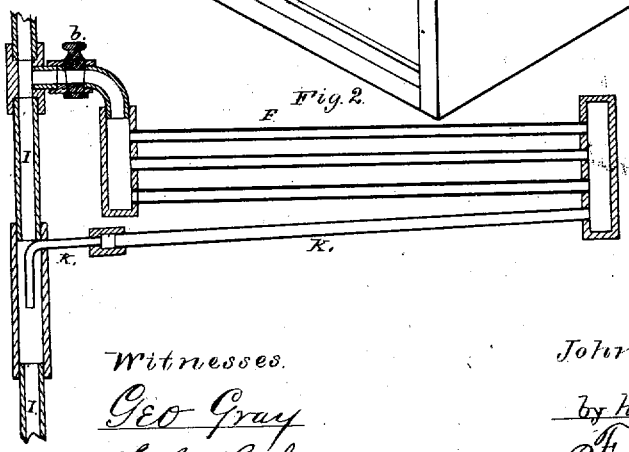

The drawings accompanying this specification represent, in Figure 1, a sectional view of a building of several stories or floors embodying my system of steam-piping. Fig. 2 is a section on an enlarged scale of a portion of the down or return part of the pipe and the drip-pipe of the radiator, to be hereinafter explained.

In the drawing, A denotes a steam-generator, of any suitable character, placed in the cellar or basement B of the structure C; affixed to such generator is a main supply-pipe or conduit, D, which rises vertically and extends to a point in the building above which the highest radiator or coils are to be located. A steam-radiator, F, is placed in each of the stories G H of the structure, while a pipe, I, extends from the upper part of the main supply-pipe D, horizontally or slightly descending to the side or other wall, thence directly downward to the lower part of the basement or cellar B, in which the generator is placed, and discharges into such generator. A pipe, J, extends from the branch or return pipe I to, and communicates with, each radiator at the upper part thereof, while the outlet or escape pipe K of such radiators, leading from the bottom thereof, and for carrying off the water of condensation, connects with and discharges into the said drop-pipe I, as shown in the drawing.

At a point on the down or return pipe I, below the first or lowest radiator, and above the water-line of the boiler—as, for instance, at P, within the basement B—I arrange a valve, *p*, designed to permit the escape of air. This valve, when the apparatus is put in operation, is left open, so that the air expelled from the piping and from the several radiators by the advancing steam shall find vent at the point P. The air will have been discharged when the steam begins to blow through the discharge-pipe P, at which time the valve should be closed. Thus I am enabled to provide one common vent for all the air that may be contained in the piping and radiators; and, furthermore, to locate this vent at a point where the foul air and noxious gases can be got rid of without inconvenience to the occupants of the building. Heretofore it has been customary to provide each radiator with a vent, and the air has been discharged directly into the room in which the radiator was located.

The advantage of my venting arrangement, which is rendered practical by my system of steam-piping, is therefore apparent. $C^1$ represents a suitable coupling attached to the main supply-pipe D in each story or division of the structure, the same being provided with a valve, *c;* to these couplings a hose may be attached in case of fire, or through which steam may be discharged directly into the apartment without the intervention of hose. A valve, *a*, may be placed in such down pipe I, departing from the main supply-pipe D, near to its junction with the latter, to shut off the steam from either part of the pipe, when desirable, and a valve, *b*, is also to be attached to each radiator, near the inlet-pipe, or to the pipe itself, as shown in Fig. 1, to govern the amount of steam admitted to such radiator.

The operation of the above-described method is as follows: Steam under pressure from the generator or boiler A is conducted directly upward through the main supply-pipe D until it reaches the pipe I, down which it descends until it reaches the branch pipe J of each radiator whose valve is open. After circulating through the same, and parting with its heat, it is condensed, and the resultant water flows through the outlet or drip pipe K into the pipe I, and directly down the latter, without hinderance or check, where it is discharged into the generator A.

Having described my invention, what I claim is—

1. The herein-described system of steam-heating, the same consisting in the combination of one or more main pipes, conveying the steam without distribution to a point above the radiators, with branch piping, conveying the steam downward, and serving at one and the same time to supply steam to and conduct the water of condensation from the radiators, the steam, water, and air moving together in one direction toward the boiler, as shown.

2. In a system of steam-heating, comprising an overhead supply, the combination of the radiators or coils with the branch or return piping entering below the water-line of the boiler, as shown and described.

3. The combination, with a system of steam-piping and radiators connected therewith and operating as described, of an air vent or valve located on the branch or return piping at a point below the first or lowest radiator, but above the water-line of the boiler, as shown and described.

JOHN H. MILLS.

Witnesses:
F. P. HALE,
F. C. HALE.